(12) United States Patent
Liu et al.

(10) Patent No.: US 12,609,135 B1
(45) Date of Patent: Apr. 21, 2026

(54) TRI-LEVEL MAGNETIC RECORDING OF BITS

(71) Applicant: Seagate Technology LLC, Fremont, CA (US)

(72) Inventors: Xiong Liu, Shugart (SG); Quan Li, Shugart (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/973,398

(22) Filed: Dec. 9, 2024

(51) Int. Cl.
*G11B 5/09* (2006.01)
*G11B 5/00* (2006.01)
*G11B 5/65* (2006.01)

(52) U.S. Cl.
CPC ........ G11B 5/09 (2013.01); *G11B 2005/0021* (2013.01); *G11B 5/653* (2013.01); *G11B 5/656* (2013.01)

(58) Field of Classification Search
None
See application file for complete search history.

(56) References Cited

U.S. PATENT DOCUMENTS

| | | | | |
|---|---|---|---|---|
| 4,858,194 A * | 8/1989 | Terada | .................... | G11C 16/24 |
| | | | | 365/185.23 |
| 5,625,632 A * | 4/1997 | Ishida | .............. | G11B 20/10009 |
| | | | | 714/709 |
| 7,701,657 B2 * | 4/2010 | Lee | .................... | G11B 20/1492 |
| | | | | 360/68 |

| | | | | |
|---|---|---|---|---|
| 9,697,857 B1 * | 7/2017 | Ahner | .................... | G11B 5/676 |
| 10,803,896 B1 * | 10/2020 | Mohl | ........................ | G11B 5/09 |
| 11,276,432 B1 * | 3/2022 | Jubert | .................... | G11B 5/455 |
| 11,626,136 B1 * | 4/2023 | Chang | ..................... | G11B 5/02 |
| | | | | 369/13.33 |
| 2003/0053238 A1 * | 3/2003 | Kai | .......................... | G11B 5/00 |
| | | | | 360/59 |
| 2004/0053078 A1 * | 3/2004 | Kikitsu | .................. | G11B 5/678 |
| | | | | 428/828 |
| 2009/0080109 A1 * | 3/2009 | Fukuzawa | .............. | B82Y 10/00 |
| | | | | 360/122 |
| 2010/0149676 A1 * | 6/2010 | Khizorev | ............. | G11B 5/1278 |
| | | | | 360/110 |
| 2012/0052330 A1 * | 3/2012 | Takekuma | ............. | G11B 5/672 |
| | | | | 428/829 |
| 2014/0093747 A1 * | 4/2014 | Marinero | ........... | G11B 5/73913 |
| | | | | 428/828 |
| 2015/0138939 A1 * | 5/2015 | Hellwig | ................. | G11B 5/672 |
| | | | | 428/827 |
| 2022/0075554 A1 * | 3/2022 | Miller | ................. | G11C 11/5642 |

* cited by examiner

*Primary Examiner* — Peter Vincent Agustin

(74) *Attorney, Agent, or Firm* — Mueting Raasch Group

(57) ABSTRACT

Described are systems and methods for tri-level recording of bits on granular magnetic media, for example using a magnetic writer of a hard disk drive. Tri-level recording of bits involves recording magnetic states that can be read as three distinct levels by a magnetic reader. Tri-level recording within a single recording layer of the granular magnetic storage media can be accomplished by recording bits in a neutral bit state as well as in an up bit state and a down bit state. Neutral bits are recorded by doubling the write frequency so that the write field is reversed over the span of writing a single bit. The resulting neutral bit includes grains whose magnetic states are roughly evenly mixed between up states and down states.

20 Claims, 5 Drawing Sheets

TRI-LEVEL MAGNETIC RECORDING OF BITS

TECHNICAL FIELD

This disclosure relates to magnetic recording techniques particularly for use in hard disk drives that achieve ternary (also referred to as trinary or tri-level) recording of bits.

SUMMARY

In accordance with various aspects, the present disclosure describes methods for tri-level recording in a hard disk drive that includes a writer that records bits in tracks on a granular magnetic recording medium, the bits having a bit length measured in a down-track direction that spans multiple grains of the granular magnetic recording medium. Such methods involve, while moving the granular magnetic recording medium relative to the writer in the down-track direction, applying a write current to the writer to thereby generate a magnetic field that magnetically orients grains of the granular magnetic recording medium positioned immediately under the writer and according to the magnetic field direction. In such a way, plus bits are recorded by applying a positive write current for substantially an entire duration over which the plus bit is positioned immediately under the writer, minus bits are recorded by applying a negative write current for substantially an entire duration over which the minus bit is positioned immediately under the writer, and neutral bits are recorded by applying a positive write current for about one half of a duration over which the neutral bit is positioned immediately under the writer and by applying a negative write current for about another half of the duration over which the neutral bit is positioned immediately under the writer. The positive and negative write currents may be applied in any order or sequence.

In certain aspects, the grains of the magnetic recording medium have an average size of about 7 nm or less. In certain aspects, the grains of the magnetic recording medium are composed of an FePt alloy, a NdFeB alloy, or a cobalt-based alloys that includes at least one of nickel, chromium, or phosphorous. In certain aspects the bit length spans no more than 4 grains. In certain aspects, the bits have a width to length aspect ratio of about 4 to 1.

In certain aspects, the methods further include reading and decoding the recorded tracks of bits according to a tri-level bit recording scheme.

In certain aspects, the hard disk drive is a HAMR hard disk drive.

In accordance with various aspects, the present disclosure describes methods for writing a data track of up bits, down bits, and neutral bits on a granular magnetic recording medium comprised of a plurality of grains, each of the bits in the data track having substantially the same bit length and including substantially the same number of grains. Such methods include switching a write current between positive and negative at a normal write current frequency determined by the bit length to thereby write up bits characterized by substantially all the up bit grains being oriented in an up direction and to thereby write down bits characterized by substantially all the down bit grains being oriented in a down direction, and switching the write current between positive and negative at twice the normal write current frequency to thereby write neutral bits characterized by substantially half the neutral bit grains being oriented in an up direction and substantially half the neutral bit grains being oriented in a down direction.

In accordance with various aspects, the present disclosure describes hard disk drive devices that include magnetic recording media having bits recorded according to a tri-level recording scheme including up bits, down bits, and neutral bits on a single granular magnetic recording layer comprised of a plurality of magnetic grains, in which the neutral bits are each composed of roughly equal numbers of up grains and down grains. Such hard disk drive devices further include recording heads configured to write data to and read data from the magnetic recording media according to the tri-level recording scheme, as well as controller electronics coupled to the recording head and configured to control switching of a write current applied to the recording head. In certain aspects, the magnetic recording media and the recording heads are configured for heat-assisted magnetic recording.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
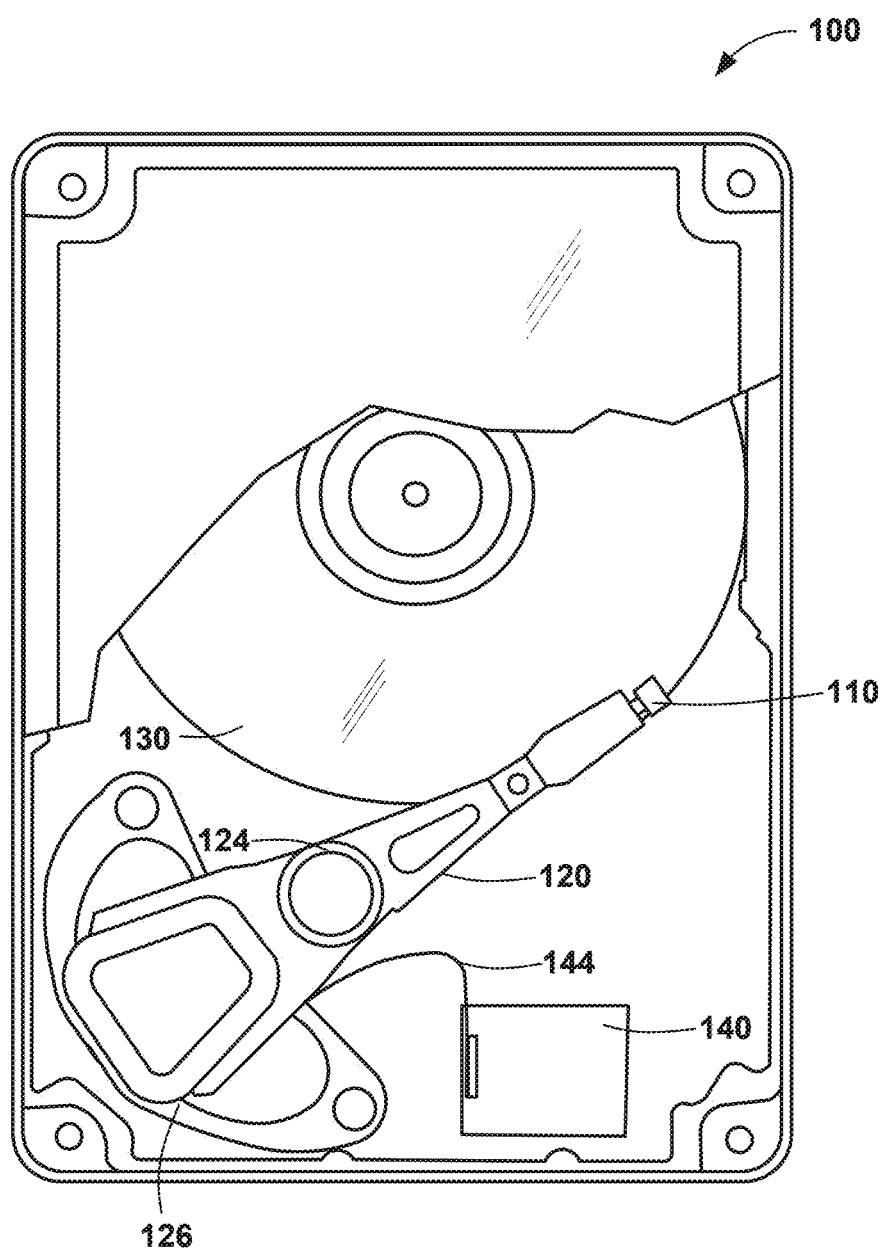
FIG. 1 is a schematic representation of a hard disk drive device that may be used in accordance with aspects of the present disclosure.

The present disclosure relates to tri-level recording of bits on granular magnetic media, for example using a magnetic writer of a hard disk drive. Tri-level recording of bits, also referred to as ternary recording or trinary recording, involves recording magnetic states that can be read as three distinct levels by a magnetic reader. In accordance with various aspects, the present disclosure describes tri-level recording methods and systems in which three distinct levels of bit recording are accomplished within a single recording layer of granular magnetic storage media.

Granular magnetic media currently used in hard disk drives includes a recording layer made up of grains, where each grain can be oriented by a magnetic writer to have a magnetic state that is either up or down. The granular media can be formed such that the states of neighboring grains do not affect each other. This maintains stability in the recording layer. A single bit covers an area that spans many grains, and so the magnetic state of a single recorded bit is determined by the collection of magnetic states of the individual grains that make up the bit. The overall bit size is determined by the magnetic writer that is used to record the bits and the resolution capability of the magnetic reader that is used to read the bits. In current hard disk drives, a bit is recorded so that all or substantially all of the grains of the bit have the same magnetic orientation, either up or down, thus resulting in binary (or two-state) recording. In accordance with the present disclosure, in addition to the up and down bit states, a neutral bit state can be recorded by doubling the write frequency so that over the span of writing a single bit, the write field is reversed. This can allow for writing a neutral state bit whose constituent grain states are mixed between up states and down states, for example where roughly half the grains are in an up state and roughly half the grains are in a down state. When such a neutral bit is read back by a magnetic reader, the states of the grains are averaged out, and the reader detects a neutral magnetic state for the bit. By incorporating such neutral bits alongside up bits and down bits, tri-level recording can be realized in a single recording layer.

Tri-level recording can significantly increase data recording capacity. For the same bit size and density, tri-level recording increases storage capacity by 58% as compared to binary recording (which is determined by calculating $\log_2$ (3)). Moreover, systems and methods of tri-level recoding in accordance with the present disclosure enable tri-level magnetic recording within a single recording layer on granular media. Thusly, all the recording states can be written and read at the same head-to-media spacing (HMS), as opposed to multi-state recording schemes that rely on multiple recording layers at different depths in the media to achieve higher recording densities. Magnetic reading and writing at different depths can be problematic due to the large drop off in capability with increasing distance, making depth-wise magnetic recording on independent layers very impractical.

In certain aspects, systems and methods of the present disclosure may be implemented using heat-assisted magnetic recording (HAMR). HAMR refers to using heat (or other type of energy) to assist in magnetic recording. As storage densities increase and storage media grain sizes decrease to accommodate the increased capacity, it becomes necessary to increase the coercivity of the storage media to maintain stability. Thus, heat or other energy may be introduced during magnetic writing to locally lower the coercivity of the media grains during writing to thereby allow writing to occur. After writing, the area cools, resulting in highly stable recorded bits. In certain aspects, the increased stability provided in HAMR recording media grains may be beneficial for use in tri-level recording methods and systems in accordance with the present disclosure. However, the systems and methods of the present disclosure are applicable to any magnetic recording scheme on granular media.

In accordance with various aspects, methods of the present disclosure involve recording bits in one of three states, namely up (also referred to as +), down (also referred to as −), and neutral (also referred to as 0). Since the magnetic field used to write bits in current hard drives is perpendicular to the plane of the recording layer, the imparted magnetic state in the media is also perpendicular, and thus referred to as either up or down. However, it will be appreciated that the present disclosure may also be used in systems that record magnetic dipoles in the plane of the recording layer. It will also be appreciated that the terms "up" and "down" as well as "+" and "−" are used by convention to designate opposite states. An up bit refers to a bit where a large majority of the grains have a plus (+) magnetic state. A down bit refers to a bit where a large majority of the grains have a minus (−) magnetic state. A neutral bit refers to a bit where the grains are roughly evenly mixed between having a plus magnetic state and a minus magnetic state.

A neutral bit may be recorded by doubling the writing frequency that is normally used to record up bits and down bits. In binary recording, the write frequency (which may be expressed in kilo flux changes per inch, or kFCI) matches the bit density in the down-track direction (which may be expressed in kilobits per inch, or kBPI). This is because the write current for binary recording would only need to be switched at the end of a bit. In accordance with the present disclosure, the write frequency may be doubled to allow the ability to switch the write current in the middle of a bit, thus producing a bit with roughly half the grains oriented in a first direction and roughly have the grains oriented in a second, opposite direction. Such a bit is referred to as a neutral bit.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding, and are not meant to be scale drawings that accurately represent size or shape of elements. Likewise, the use of drawings or charts is meant to elucidate certain aspects and concepts without being bound to exactitude or to any theory.

FIG. 1 schematically depicts a typical hard disk drive (HDD) device 100 that includes a recording head (also referred to as a slider) 110 disposed on the end of an actuator arm 120 that is rotationally movable around a pivot 124 by use of a voice coil motor (VCM) 126. The recording head 110 is positioned in close proximity to the surface of magnetic media disk(s) 130 such that the recording head 110 can write data bits to and read data bits from tracks on the magnetic media 130 as it spins by action of a spindle motor (not indicated). In many HDDs, the magnetic media 130 is provided as a stack of disks having recording surfaces that are accessed by recording heads provided on the ends of a stack of actuator arms that are interleaved between the disks. For simplicity, FIG. 1 illustrates a single disk 130, actuator arm 120, and recording head 110.

Electronics for conditioning signals to and from the recording head 110 may be included on or close to the recording head 110. Controller electronics 140 may be connected to VCM 126 and recording head 110 via a flex cable 144 that connects to traces on the actuator arm 120. Controller electronics 140 may also control the spinning of the media disk(s) 130. HDD device 100 may operate on any magnetic recording principle, whether that be conventional magnetic recording (CMR), shingled magnetic recording (SMR), heat-assisted magnetic recording (HAMR), or any other type of recording technique and combinations thereof. While the actuator 120 is shown to move rotationally, the present disclosure is not limited to how the actuator moves and encompasses linear actuation. Likewise, recording head 110 can be provided on movable or stationary rails, or in any other suitable manner now known or later contemplated.

In accordance with the present disclosure, magnetic media 130 is granular magnetic media, meaning that the magnetic recording layer is characterized by a random distribution of somewhat closely-packed crystalline and/or poly-crystalline grains of material, often of roughly similar size (although media having anisotropic and/or irregularly shaped grains may also be used). The average grain size is typically expressed in nanometers, and may be thought of as the diameter of a circle that would roughly cover the majority of the grain. The average grain size of media used in current HDDs may be less than about 7 nm. In current HAMR HDD devices, the average magnetic media grain size may be about 6 nm or less. The grains of the magnetic recording layer may be composed of any suitable material, for example an iron-platinum alloy (FePt) or other alloys such as NdFeB or various cobalt-based alloys that may include nickel, chromium, phosphorous, and/or other materials. It will be appreciated that various aspects of the present disclosure may be realized utilizing different media materials and grain structure characteristics including grain size and shape, grain distribution and packing density, grain property anisotropies, and so forth.

Figure 2:
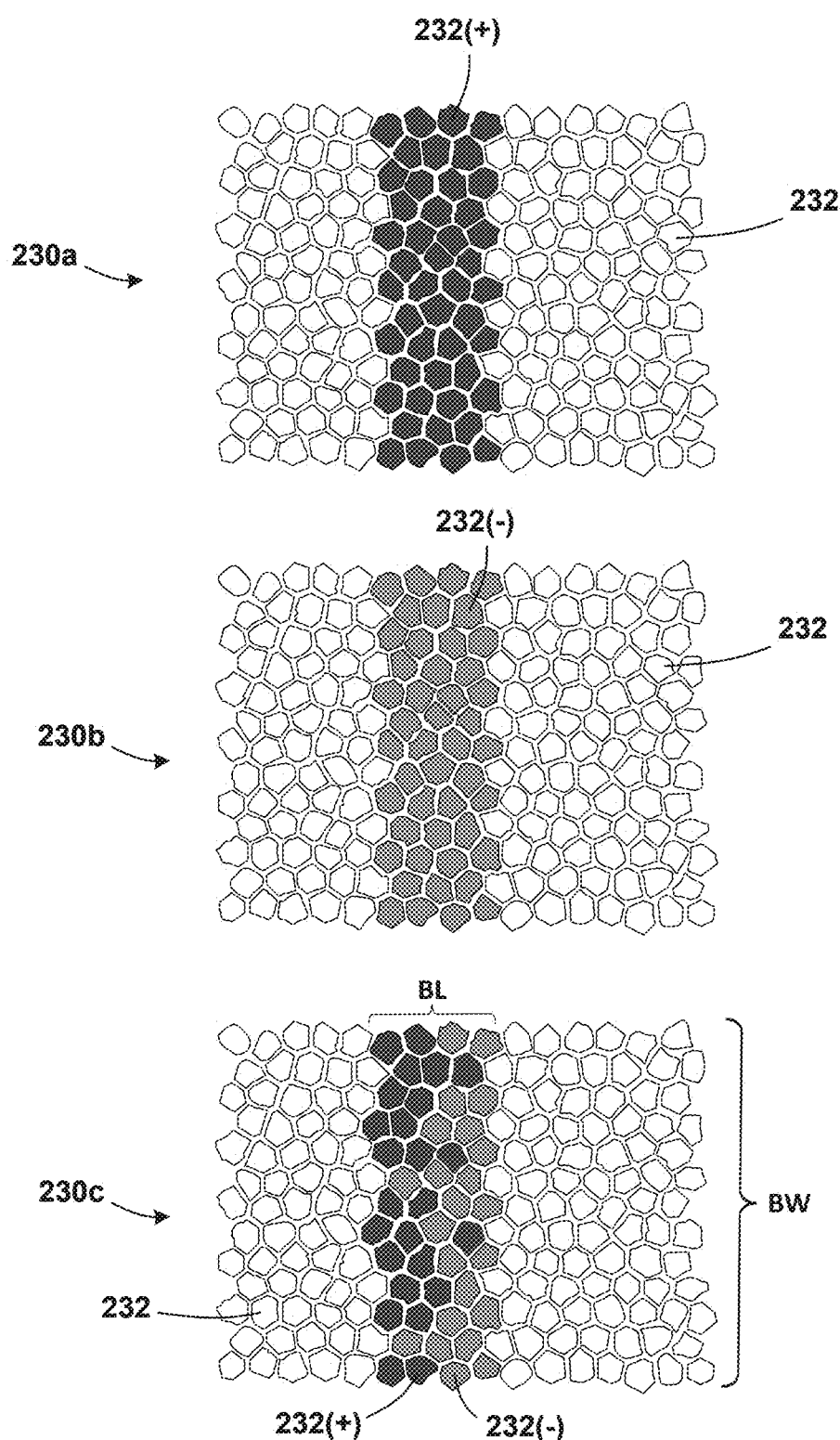
FIG. 2 is a schematic representation of bits recorded on a granular magnetic recording layer in accordance with aspects of the present disclosure.

FIG. 2 schematically depicts three examples of same-sized bits recorded on a recording layer of a granular recording medium made up of grains 232. Each bit has a bit width (BW) and a bit length (BL) that are defined given the read and write capabilities of the recording device as well as the grain structure of the media. For example, granular media 230a is shown to include an up bit made up of grains 232 (+) written to have an up magnetic state. As shown, the bit is roughly 3 to 4 grains long and 12 to 13 grains wide, resulting in a bit that includes roughly 40 to 50 grains. In many current hard drives, the bits may have an aspect ratio up to 4:1, meaning the bit width is 4 times greater than the bit length. Within a given data track, the size, aspect ratio, and density of the bits is substantially the same. However, it will be understood that due to skew and other effects, the size, aspect ratio, and density of the bits in tracks recorded at the outer diameter (OD), middle diameter (MD), and inner diameter (ID) of the media disk may differ slightly. Granular media 230b includes a down bit made up of grains 232 (−) written to have a down magnetic state. Granular media 230c includes a neutral bit made up of roughly half plus grains 232 (+) and half minus grains 232 (−). The neutral bit shown in media 230c may be formed by switching the write current from plus to minus as the media 230c is moved in the down-track direction (that is, aligned with the BL direction), from right to left on the page, beneath a writer (not shown).

Preferably, the bits span a sufficient number of grains in the BL direction so that switching the write current (whether from plus to minus, or minus to plus) during the writing of a neutral bit will result in grain states that are roughly evenly mixed between up and down. For example, a bit length that spans at least about 2 grains, or even less than 2 grains, may be sufficient. While the write current switching may result in a majority of the up grains being on one half of the bit length and a majority of the down grains being on the other half, the recording of a neutral bit may result in a mix of up and down grains on both halves of the bit. Overall, the number of up and down grains over a neutral bit may be roughly equal. For example, the neutral bit shown on media 230c in FIG. 2 is composed of 25 up grains and 23 down grains. Including more grains per bit by either decreasing the grain size or increasing the bit length may result in higher quality neutral bits. While increasing the bit length results in a lower bit density (kBPI), the ability to record tri-level bits will still result in a 27% gain in overall storage capacity even if the bit length was increased by 20%.

Figure 3:
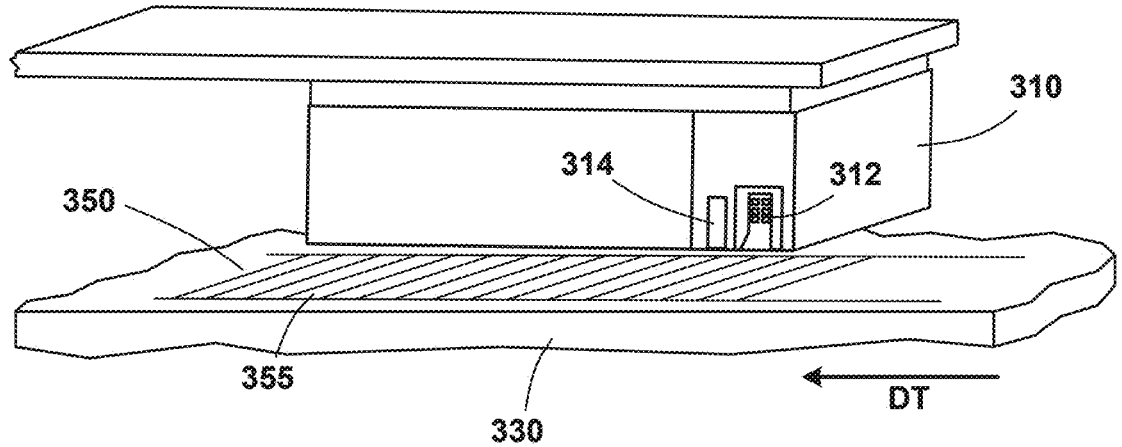
FIG. 3 is a schematic representation of a recording head for writing data to and reading data from a magnetic recording medium.

FIG. 3 shows a schematic perspective view of a magnetic recording head 310 that incorporates a writer 312 and a reader 314 disposed over a recording surface of a magnetic recording medium 330. Data track 350 includes bits 355 being written by writer 312 as the medium 330 is moved underneath the recording head 310 in a down-track (DT) direction, indicated by the arrow.

Figure 4:
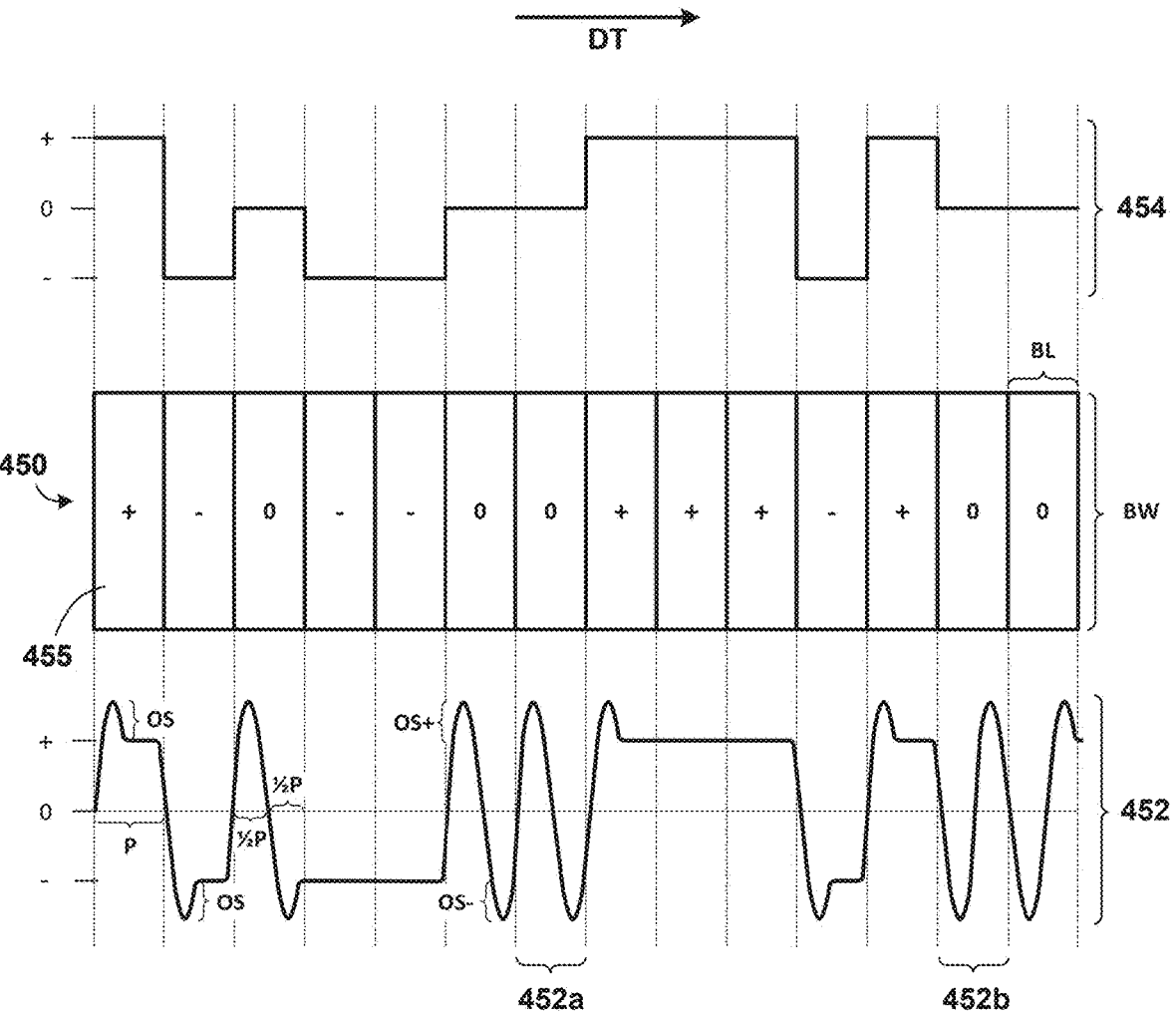
FIG. 4 schematically shows a track of tri-level bits along with a corresponding idealized read signal as well as a write current that may be used to produce the track of tri-level bits in accordance with aspects of the present disclosure.

FIG. 4 schematically depicts a track 450 of bits 455 having width BW and length BL, the track being aligned in a down-track direction DT indicated by the arrow. Each of the bits has an indicated magnetic state in accordance with a tri-level recording scheme, a plus (+) state, a minus (−) state, and a neutral (0) state. An idealized reader signal 454 indicates the states that a reader would detect when reading each bit. Such a tri-level recording scheme increases the storage capacity relative to a binary recording scheme by about 58% for bits of the same size. An example write current signal 452 that may be used to produce the pattern of bits 455 is also shown. In binary (two-level) recording, the period P for switching the write current is determined by the bit length BL and the speed of the media moving under the write head. The write frequency is then proportional to 1/P. For tri-level recording, write current switching can occur over a period of ½P, resulting in a write frequency that is proportional to 2/P, or twice the write frequency used in binary recording. For example, as can be seen during write period 452a, the write current is positive for the first half of the bit cycle and negative for the second half of the bit cycle. Switching the write current in the middle of a bit functions to record roughly half of the bit grains in an up state and half of the bit grains in a down state, thereby producing a neutral bit. Write period 452b indicates that the write current switching can also go from negative to positive (as opposed to positive to negative for write period 452a) and still produce a neutral bit.

When the write current is switched from one polarity to the opposite polarity, there is typically an overshoot OS before the write current settles into a steady state at the appropriate level. The settle time is preferably less than the write period P. The overshoot OS helps compensate for the finite amount of rise time (or drop time) during switching between polarities. Due to the multiple switching that occurs during recording of neutral bits in tri-level recording, it may be desirable to adjust the overshoot during recording of neutral bits. Thus, as shown in FIG. 4, the neutral bit write current may have a different overshoot OS+ or OS− than the overshoot OS used for + or − bits. Moreover, the overshoots used in neutral bit recording may be different in the positive overshoot OS+ and the negative overshoot OS−. In particular, the neutral bit write current overshoots OS+ and OS− may both be greater than overshoot OS used for + or − bits, thereby enhancing the quality of the neutral bit by ensuring that a mix of up grains and down grains are recorded.

Figure 5:
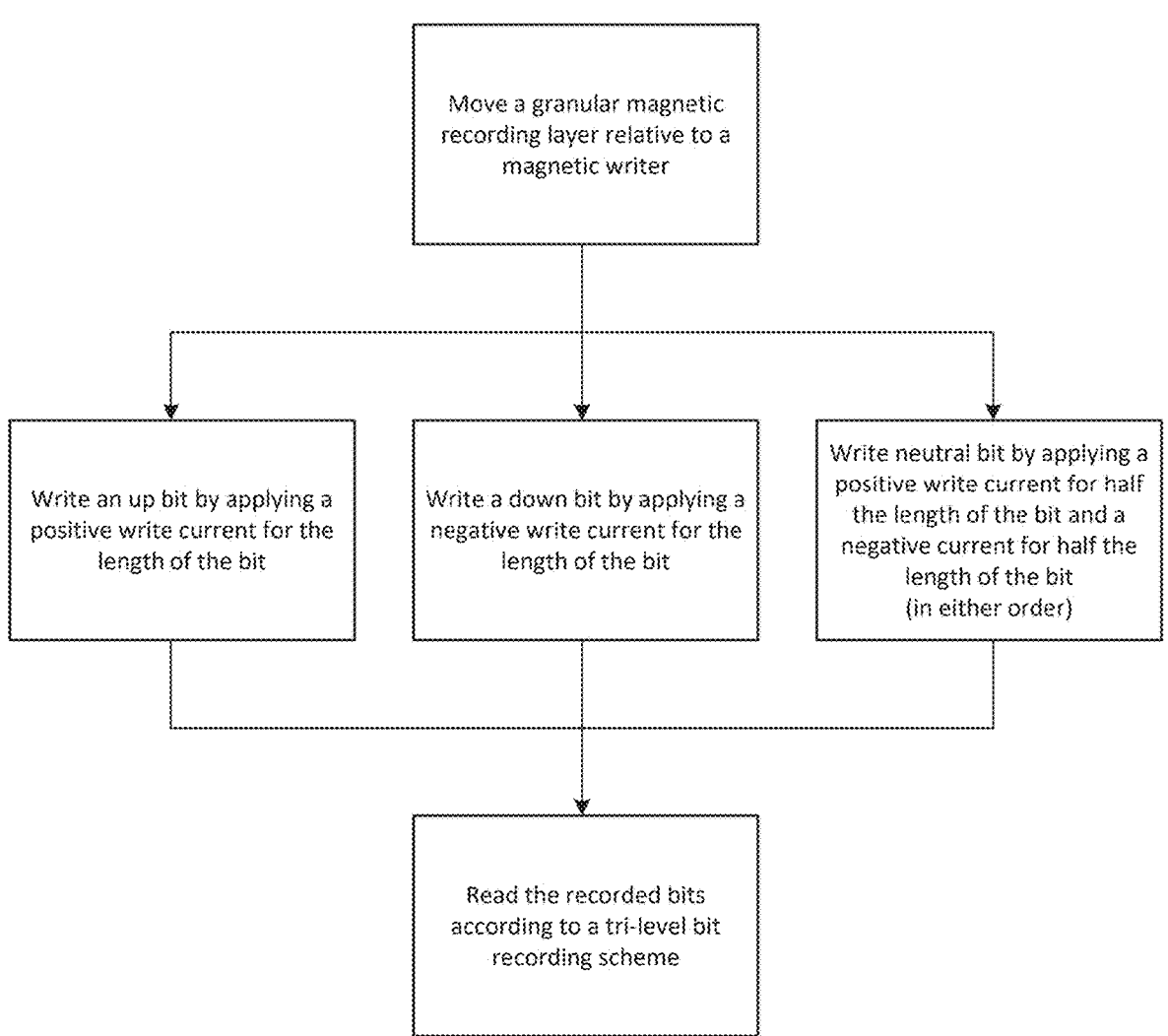
FIG. 5 is a flow chart depicting steps that may be used in performing methods in accordance with the present disclosure.

FIG. 5 is a flow chart depicting steps that may be performed in writing tri-level bits on granular magnetic recording media in accordance with various aspects of the present disclosure. As the recording layer of the granular magnetic media is moved relative to a magnetic writer, the write current that is applied to the writer determines the bits that are written. For standard up bits and down bits, a positive or a negative write current, respectively, is applied to the writer for the duration of the bit so that substantially all the grains (or at least a large proportion thereof) are oriented in the same direction aligned to the applied magnetic field. To write a neutral bit, the write current is switched between positive and negative while the writer is over the bit in such a way that roughly half the grains are magnetically oriented in an up direction and roughly half the grains are magnetically oriented in a down direction. This may be accomplished by doubling the normal switching frequency of the write current. It should be noted that the write current can be switched between positive and negative in any order or sequence to write a neutral bit, provided that the write current is positive for about half the bit and negative for about half the bit. In particular, it may be convenient to write a neutral bit starting with a write current in the opposite positive or negative state that was used at the end of writing the previous bit (see, for example, write period 452b in FIG. 4, in which the writing of a neutral bit immediately follows the writing of a plus bit, and thus begins by switching to a negative write current). In accordance with the steps described in FIG. 5, three bit levels can be written to the granular magnetic recording layer. The data should thus be encoded and decoded according to a tri-level bit recording scheme so that the three bit levels can be read back by a magnetic reader and reconstructed for sending to a host device.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A method for tri-level recording in a hard disk drive that includes a writer that records bits in tracks on a granular magnetic recording medium, the bits having a bit length measured in a down-track direction that spans multiple grains of the granular magnetic recording medium and such that, while moving the granular magnetic recording medium relative to the writer in the down-track direction, applying a write current to the writer generates a magnetic field capable of magnetically orienting grains of the granular magnetic recording medium positioned immediately under the writer, the method comprising:

recording a plus bit by applying a positive write current for substantially an entire duration over which the plus bit is positioned immediately under the writer;

recording a minus bit by applying a negative write current for substantially an entire duration over which the minus bit is positioned immediately under the writer; and recording a neutral bit by applying a positive write current for about one half of a duration over which the neutral bit is positioned immediately under the writer and by applying a negative write current for about another half of the duration over which the neutral bit is positioned immediately under the writer.

2. The method of claim 1, wherein the grains of the magnetic recording medium have an average size of about 7 nm or less.

3. The method of claim 1, wherein the grains of the magnetic recording medium are composed of an FePt alloy, a NdFeB alloy, or a cobalt-based alloys that includes at least one of nickel, chromium, or phosphorous.

4. The method of claim 1, wherein the bit length spans no more than 4 grains.

5. The method of claim 1, wherein the bits have a width to length aspect ratio of about 4 to 1.

6. The method of claim 1, further comprising reading and decoding the recorded tracks of bits according to a tri-level bit recording scheme.

7. The method of claim 1, wherein the hard disk drive is a HAMR hard disk drive.

8. A method for writing up bits, down bits, and neutral bits in a data track on a granular magnetic recording medium comprised of a plurality of grains, each of the bits in the data track having substantially the same bit length and including substantially the same number of grains, the method comprising:

switching a write current between positive and negative at a normal write current frequency determined by the bit length to thereby write up bits characterized by substantially all the up bit grains being oriented in an up direction and to thereby write down bits characterized by substantially all the down bit grains being oriented in a down direction; and switching the write current between positive and negative at twice the normal write current frequency to thereby write neutral bits characterized by substantially half the neutral bit grains being oriented in an up direction and substantially half the neutral bit grains being oriented in a down direction.

9. The method of claim 8, wherein the method is implemented in a hard disk drive.

10. The method of claim 9, wherein the hard disk drive is a HAMR hard disk drive.

11. The method of claim 8, wherein the grains of the granular magnetic recording medium are roughly uniform in size and have an average size of about 7 nm or less.

12. The method of claim 8, wherein the grains of the granular magnetic recording medium are composed of an FePt alloy, a NdFeB alloy, or a cobalt-based alloys that includes at least one of nickel, chromium, or phosphorous.

13. The method of claim 8, wherein the bit length spans more than 1 grain.

14. The method of claim 8, wherein the bits have a width to length aspect ratio of about 4 to 1.

15. The method of claim 8, further comprising reading and decoding the bits according to a tri-level bit recording scheme.

16. A hard disk drive comprising:

a magnetic recording medium having bits recorded according to a tri-level recording scheme including up bits, down bits, and neutral bits on a single granular magnetic recording layer comprised of a plurality of magnetic grains, in which the neutral bits are each composed of roughly equal numbers of up grains and down grains;

a recording head configured to write data to and read data from the magnetic recording medium according to the tri-level recording scheme; and controller electronics coupled to the recording head and configured to control switching of a write current applied to the recording head, the controller electronics configured to control switching of the write current at a normal switching frequency when recording up bits and down bits and to control switching of the write current at twice the normal switching frequency when recording neutral bits.

17. The hard disk drive of claim 16, wherein the magnetic recording medium and the recording head are configured for heat-assisted magnetic recording.

18. The hard disk drive of claim 16, wherein the granular magnetic recording layer is composed of an FePt alloy, a NdFeB alloy, or a cobalt-based alloys that includes at least one of nickel, chromium, or phosphorous.

19. The hard disk drive of claim 16, wherein the magnetic grains are roughly uniform in size and have an average size of about 7 nm or less.

20. The hard disk drive of claim 16, wherein the normal switching frequency is based on a bit length of the bits as measured in a down-track direction.

* * * * *